(12) United States Patent
Cui et al.

(10) Patent No.: US 11,374,476 B2
(45) Date of Patent: Jun. 28, 2022

(54) SOUNDING DEVICE

(71) Applicant: AAC Technologies Pte. Ltd., Singapore (SG)

(72) Inventors: Zhiyong Cui, Shenzhen (CN); Yun Tang, Singapore (SG); Jie Ma, Shenzhen (CN); Yao Wang, Shenzhen (CN); Lubin Mao, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 194 days.

(21) Appl. No.: 16/995,757

(22) Filed: Aug. 17, 2020

(65) Prior Publication Data

US 2021/0021186 A1 Jan. 21, 2021

Related U.S. Application Data

(63) Continuation of application No. PCT/CN2019/096354, filed on Jul. 17, 2019.

(51) Int. Cl.
*H02K 33/16* (2006.01)
*H02K 7/08* (2006.01)

(52) U.S. Cl.
CPC ............... *H02K 33/16* (2013.01); *H02K 7/08* (2013.01)

(58) Field of Classification Search
CPC ........................................................ H02K 33/16

USPC ........................................................ 310/17
See application file for complete search history.

(56) References Cited

U.S. PATENT DOCUMENTS

| 7,005,811 | B2 * | 2/2006 | Wakuda | B06B 1/0215 |
| | | | | 318/128 |
| 7,439,641 | B2 * | 10/2008 | Ogino | H02K 33/16 |
| | | | | 310/15 |
| 10,399,122 | B2 * | 9/2019 | Akanuma | H02K 33/16 |
| 2013/0169071 | A1 * | 7/2013 | Endo | H02K 33/12 |
| | | | | 310/25 |
| 2017/0110947 | A1 * | 4/2017 | Mao | H02K 7/12 |
| 2018/0056329 | A1 * | 3/2018 | Akanuma | H02K 33/16 |
| 2019/0296627 | A1 * | 9/2019 | Takahashi | H02K 35/04 |

* cited by examiner

*Primary Examiner* — Alexander Talpalatski
(74) *Attorney, Agent, or Firm* — W&G Law Group (57) ABSTRACT

A linear vibration motor includes a housing with a receiving space, a vibrator received in the receiving space, a coil for driving the vibrator to vibrate, a guide member for guiding movement of the vibrator, and a recover assembly fixed to a side of the vibrator. The vibrator includes a magnetic circuit system with first and second magnets. The recover assembly is closed to the first magnet. A magnetic polarity of an end of the magnetic recovery assembly facing the vibrator is reverse to that of an end of the first magnet away from the second magnet. When the vibrator is in an equilibrium position, a centroid of the vibrator is located between the magnetic recovery assembly and the coil. Magnetic force between the magnetic recovery assembly and the magnetic circuit system provides recovery force for the vibrator, thereby realizing large-stroke vibration.

13 Claims, 11 Drawing Sheets

SOUNDING DEVICE

CROSS REFERENCE TO RELATED APPLICATIONS

This non-provisional patent application is a continuation application of International Application PCT/CN2019/096354, filed on Jul. 17, 2019, the content of which is incorporated herein by reference.

FIELD OF THE INVENTION

The present disclosure relates to the field of vibration motors, in particular to a linear vibration motor.

BACKGROUND

Linear motors are also known as straight-line motors and push-rod motors, etc. The most common type of linear motors include flat, U-slot, and tubular ones, which relates to a technology that converts electrical energy into mechanical energy of linear motion. In the linear motor, a moving element is suspended by repulsive force of a magnet while being directly driven by magnetic force, without any transmission mechanism such as a gear set for driving as in a rotary motor. Therefore, the linear motor can make its driven moving elements reciprocate with high acceleration and deceleration. Through this characterization, the linear motor can be used in different manufacturing and processing technology fields, as a driving power source or as a technology for positioning. In addition, with the rapid development and fierce competition in industries such as semiconductors, electronics, optoelectronics, medical equipment and automation control, the requirements on linear motion performance of motors in various fields are also increasing. It is expected that motors have high speed, low noise, high positioning accuracy and so on. Thus, in many applications, the linear motors have been used to replace traditional servo motors in which mechanically driven movement is performed.

In the traditional linear motor, a real spring is used as a supporting structure. The real spring used to connect a vibrator and a stator, includes many types and styles of structure and mainly plays a role of connection and guidance. However, the real spring generally has a complicated structure with welding or gluing required, which occupy a part of the space of the device. Furthermore, the real spring has limited elastic deformation so as to move only in a small stroke, and is prone to occur reliability issues during long-term work.

Therefore, there is a desire to provide a novel linear vibration motor which overcomes at least one of the above problems.

SUMMARY

The main technical problems solved by the present disclosure are that a real spring occupies a part of the space of the device when it is used as a support structure to connect a vibrator and a stator, and the real spring has limited elastic deformation so as to move only a small stroke and is prone to occur reliability issues during long-term work.

The present disclosure provides a linear vibration motor which comprises a housing with a receiving space, a vibrator received in the receiving space, a coil fixed to the housing for driving the vibrator to vibrate, a guide member fixed to the housing, and a magnetic recovery assembly fixed to the housing. The vibrator comprises a magnetic circuit system which comprises a first magnet and a second magnet both being magnetized in a vibration direction of the vibrator, magnetic polarities of opposing surfaces of the first magnet and the second magnet being the same. The coil surrounds the magnetic circuit system and spaced apart from the magnetic circuit system. The guide member is slidably connected with the vibrator and supporting the vibrator in a direction perpendicular to the vibration direction of the vibrator. The magnetic recovery assembly is close to the first magnet and a magnetic polarity of a side of the magnetic recovery assembly facing the vibrator is reverse to that of an end of the first magnet away from the second magnet. Magnetic force between the magnetic recovery assembly and the magnetic circuit system provides a recovery force for the vibrator. When the vibrator is in an equilibrium position, a centroid of the vibrator being located between the magnetic recovery assembly and the coil.

In some embodiments, the magnetic recovery assembly includes a first magnetic recovery member and a second magnetic recovery member located on opposite sides of the magnetic circuit system in a direction perpendicular to the vibration direction of the vibrator, and magnetic polarities of opposing faces of the first magnetic recovery member and the second magnetic recovery member are the same as each other.

In some embodiments, the magnetic recovery assembly further includes a third recovery member and a fourth recover member located on opposites sides of the magnetic circuit system in another direction perpendicular to the vibration direction of the vibrator, magnetic polarities of opposing faces of the third recovery member and the fourth recovery member are the same as each other, and the first recovery member, the second recovery member, the third recovery member and the fourth recovery member cooperatively form a ring surrounding the vibrator.

In some embodiments, the magnetic recovery member is in a ring shape and sleeved over the vibrator.

In some embodiments, the magnetic circuit system further comprises a pole plate fixed between the first magnet and the second magnet.

In some embodiments, the housing includes a first end cover and a second end cover arranged oppositely in the vibration direction of the vibrator, the guide member includes a guide shaft provided between the first end cover and the second end cover and extending along the vibration direction of the vibrator, and the vibrator is slidably sleeved on the guide shaft.

In some embodiments, the vibrator further comprises a weight fixed to an end of the magnetic circuit system close to the magnetic recovery assembly, a first bearing is embedded in the weight, and the weight is in sliding fit with the guide shaft via the first bearing which is slidably sleeved on the guide shaft.

In some embodiments, a second bearing is embedded in the second magnet and the second magnet is in sliding fit with the guide shaft via the second bearing which is slidably sleeved on the guide shaft.

In some embodiments, the housing comprises a first end cover and a second end cover arranged oppositely in the vibration direction of the vibrator, and an enclosure wall enclosing the vibrator in the vibration direction of the vibrator, and the enclosure wall, the first end cover and the second end cover cooperatively form the receiving space; and wherein the vibrator further comprises a weight fixed to an end of the first magnet away from the coil, the guide member comprises a guide rail formed on a face of one of the enclosure wall and the weight, and a guide slot formed in a face of the other of the enclosure wall and the weight, the guide rail being slidable in the guide slot to thereby guide movement of the vibrator.

In some embodiments, the guide rail is formed on opposite sides of the vibrator and correspond one-to-one with the sliding portion.

In some embodiments, a magnetization direction of the magnetic recovery assembly is perpendicular to a magnetization direction of the first magnet.

In some embodiments, when the vibrator is in the equilibrium position, orthographic projections of the first magnet and magnetic recovery assembly on the guide shaft in a direction perpendicular to the vibration direction of the vibrator at least partially overlap with each other.

In some embodiments, when the coil is de-energized, the vibrator is located at a balance position where an end surface of the first magnet away from the second magnet is aligned with a middle position of the magnetic recovery assembly.

Compared with the related art, two parts of the sounding device provided by the present disclosure are connected by a spring, which realizes the integrity of the split direct driving type sounding device, reduces the assembly requirement for the screen. The magnetic circuit using five magnets is applied between the upper and first housings to cause the internal attractive forces of the sounding device to be counteracted with each other, which reduces the assembly requirement for the screen, realizes the applicability of different types of screens, and protects the screen effectively.

BRIEF DESCRIPTION OF THE DRAWINGS

In order to explain the technical solutions of the embodiments of the present disclosure more clearly, accompanying drawings used to describe the embodiments are briefly introduced below. It is evident that the drawings in the following description are only concerned with some embodiments of the present disclosure. For those skilled in the art, in a case where no inventive effort is made, other drawings may be obtained based on these drawings.

DESCRIPTION OF THE EMBODIMENTS

The present disclosure will be further illustrated with reference to the accompanying drawings. It shall be noted that the elements of similar structures or functions are represented by like reference numerals throughout the figures. The embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

Embodiment I

Figure 1:
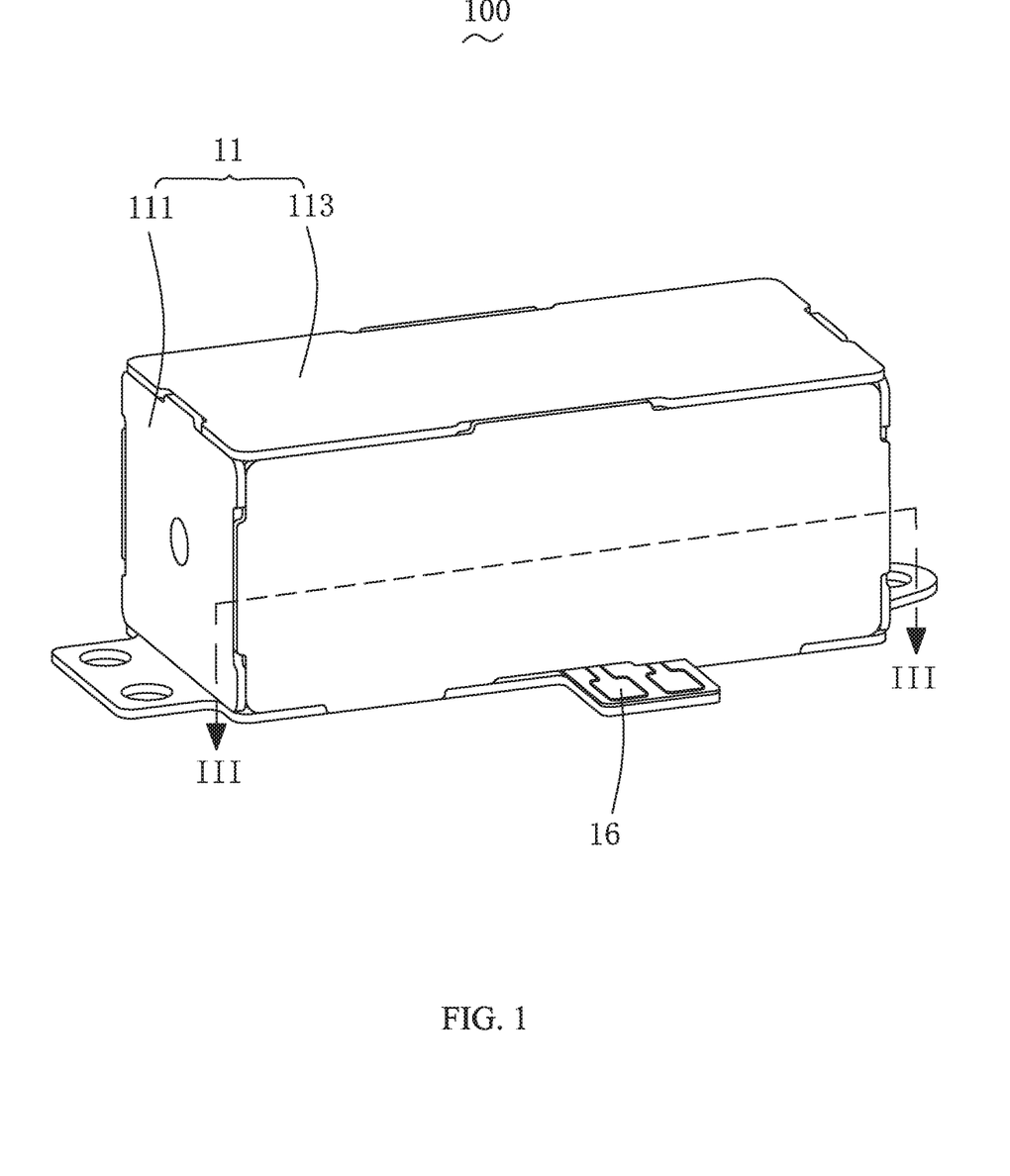
FIG. 1 is a schematic perspective view of a first embodiment of a linear vibration motor according to the present disclosure.
Figure 2:
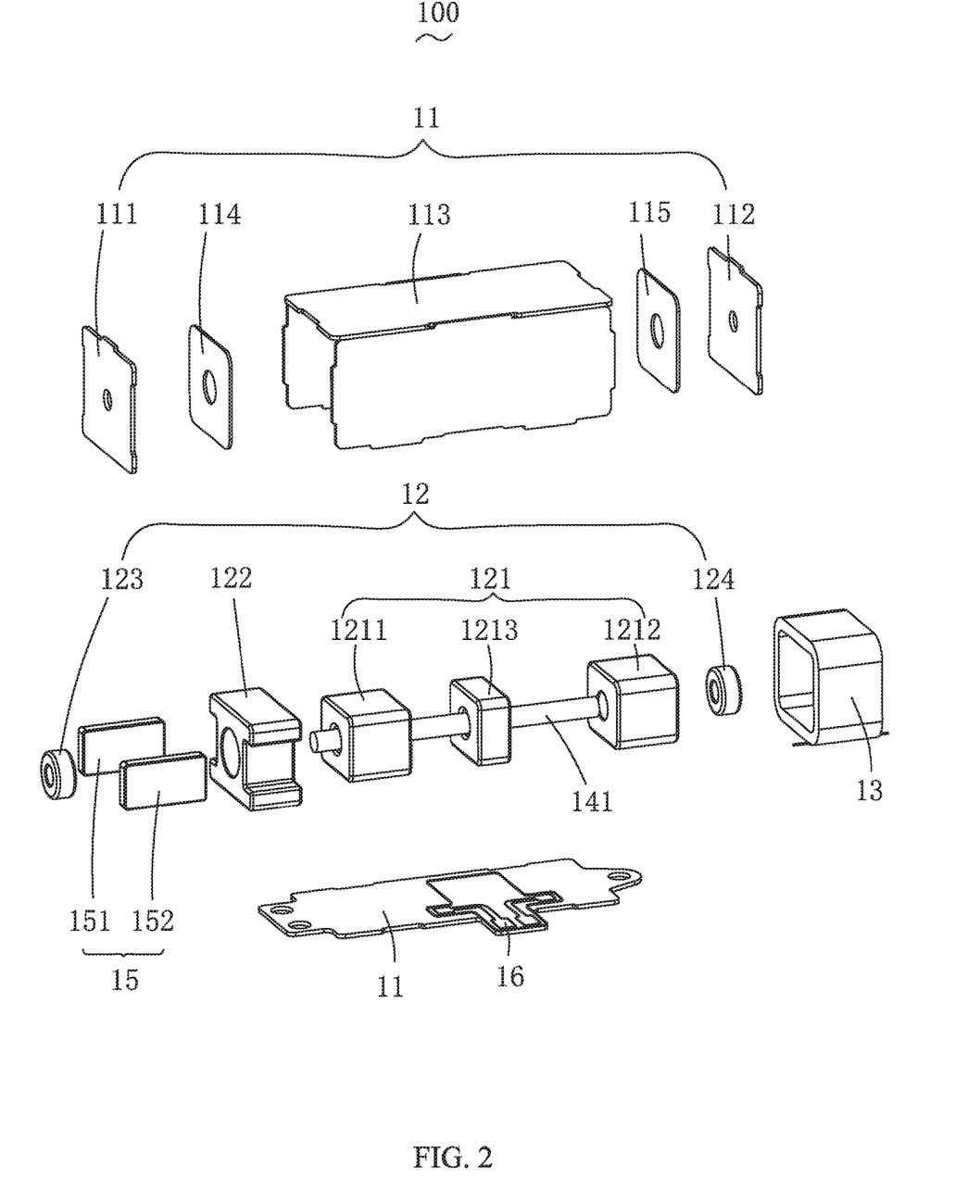
FIG. 2 is a schematic exploded view of the first embodiment of the linear vibration motor shown in FIG. 1.
Figure 3:
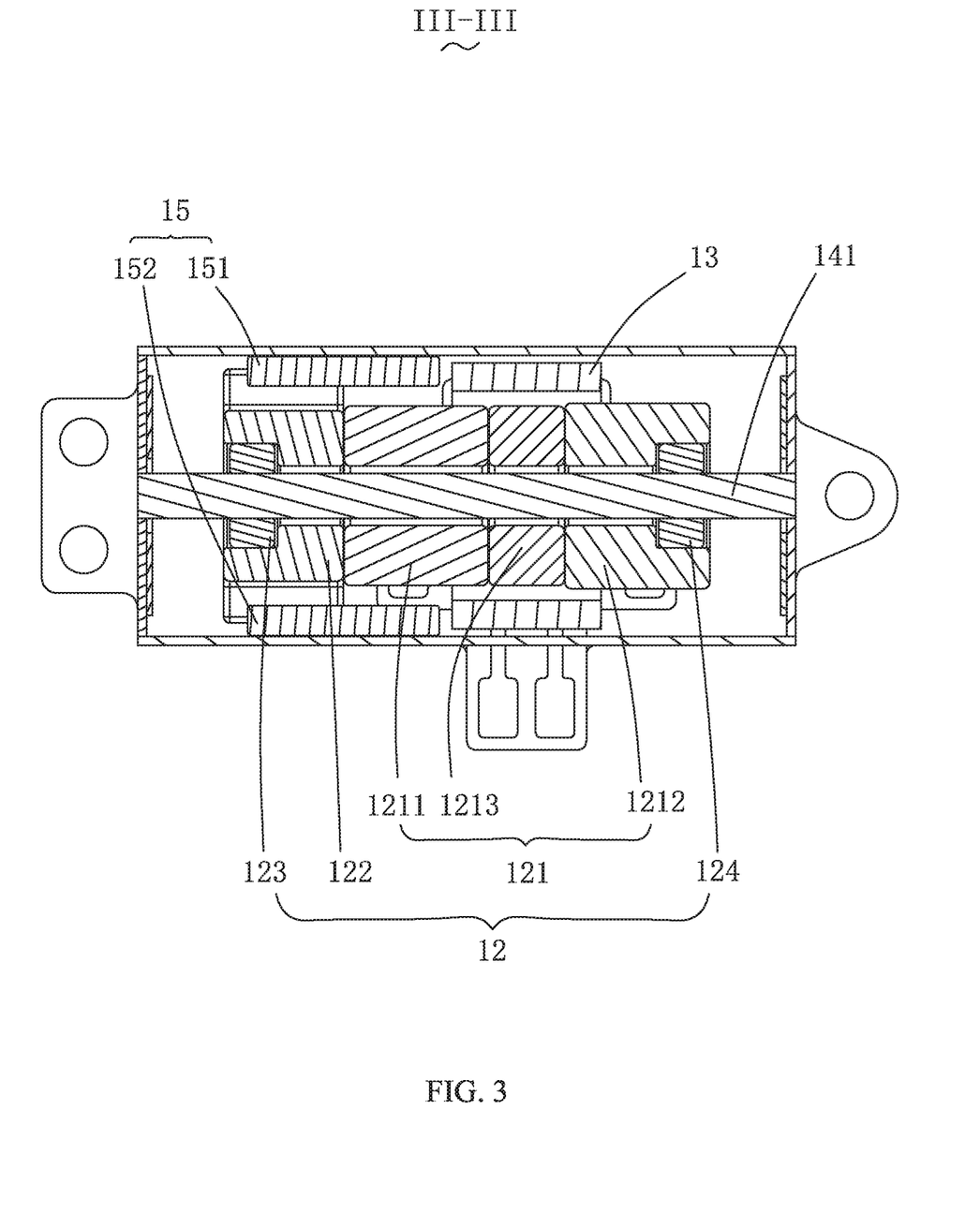
FIG. 3 is a cross-sectional view taken along line of the first embodiment of the linear vibration motor shown in FIG. 1.

FIG. 1 is a schematic perspective view of a linear vibration motor 100 according to a first embodiment of the present disclosure, FIG. 2 is an exploded schematic view of the linear vibration motor 100 shown in FIG. 1, and FIG. 3 is a cross-sectional view taken along the line of a first embodiment of the linear vibration motor shown in FIG. 1.

Referring to FIG. 1 to FIG. 3, the linear vibration motor 100 includes a housing 11 having a receiving space, a vibrator 12 received in the receiving space, a coil 13 fixed to the housing 11 for driving the vibrator 12 to move, a guide member 14 fixed to the housing 11, a magnetic recovery assembly 15 fixed to the housing 11 and a flexible circuit board 16.

The housing 11 includes a first end cover 111 and a second end cover 112 oppositely arranged in a vibration direction of the vibrator 12, and a connecting cover 113 connecting the first end cover 111 and the second end cover 112 and surrounding the receiving space.

The vibrator 12 includes a magnetic circuit system 121, a weight 122, a first bearing 123 and a second bearing 124. The magnetic circuit system 121 includes a first magnet 1211, a second magnet 1212 and a pole plate 1213 fixedly connected together. The first magnet 1211 and the second magnet 1212 are magnetized along the vibration direction of the vibrator 12, and magnetizing directions of the first magnet 1211 and the second magnet 1212 are reverse to each other. Thus, magnetic polarities of opposing surfaces of the first magnet 1211 and the second magnet 1212 are the same. The pole plate 1213 is fixed between the first magnet 1211 and the second magnet 1212. The weight 122 is fixed to an end of the magnetic circuit system 121 close to the magnetic recovery assembly 15. The weight 122 is connected and moveable with the first magnet 1211. The first bearing 123 is securely embedded in the weight 122, and the second bearing 124 is securely embedded in the second magnet 1212.

The coil 13 surrounds the magnetic circuit system 121 and is spaced apart from the magnetic circuit system 121 in a direction perpendicular to the vibration direction of the vibrator 12. Preferably, when the vibrator is in an equilibrium position where the coil 13 is de-energized, the middle position of the coil 13 in the vibration direction of the vibrator 12 is aligned with the middle position of the pole plate 1213 in the moving direction of the vibrator 12.

The guide member includes a guide shaft 141 installed between the first end cover 111 and the second end cover

112. The guide shaft 141 extends along the vibration direction of the vibrator 12. The weight 122 is in sliding fit with the guide shaft 141 via the first bearing 123. The second magnet 1212 is in sliding fit with the guide shaft 141 via the second bearing 124. The first bearing 123, the weight 122, the first magnet 1211, the pole plate 1213, the second magnet 1212 and the second bearing 124 are sequentially sleeved on and slidable relative to the guide shaft 141.

The magnetic recovery assembly 15 is fixed to the housing 11 and located at a side of the vibrator 12 in the vibration direction. The magnetic recovery assembly 15 is close to one end of the first magnet 1211 away from the second magnet 1212. The magnetic polarity of an end of the recovery member 15 facing the vibrator 12 close to the coil 13 is reverse to that of an end of the first magnet 1211 away from the second magnet 1212. Thus, a magnetic attraction force can be generated between the recovery member 15 and the first magnet 1211. Magnetic attraction force between the magnetic recovery assembly 15 and the magnetic circuit system 121 provides a recovery force for the vibrator 12. When the vibrator 12 is located at an equilibrium position, a centroid of the vibrator 12 is located between the magnetic recovery assembly 15 and the coil 13.

The magnetic recovery assembly 15 includes a first magnetic recovery member 151 and a second magnetic recovery member 152 located at opposite sides of the magnetic circuit system 121 in the direction perpendicular to the vibration direction of the vibrator 12. Magnetization directions of the first magnetic recovery member 151 and a second magnetic recovery member 152 are reverse to each other and thus magnetic polarities of opposing faces of the first recovery member 151 and the second recovery member 152 are the same as each other.

Specifically, a magnetization direction of the magnetic recovery assembly 15 is perpendicular to the magnetization direction of the first magnet 1211. When the vibrator 12 is located at the equilibrium position, orthographic projections of the first magnet 1211 and the magnetic recovery assembly 15 on a plane containing the guide shaft 141 in the direction perpendicular to the sliding direction of the weight 122 at least partially overlap with each other.

Figure 4:
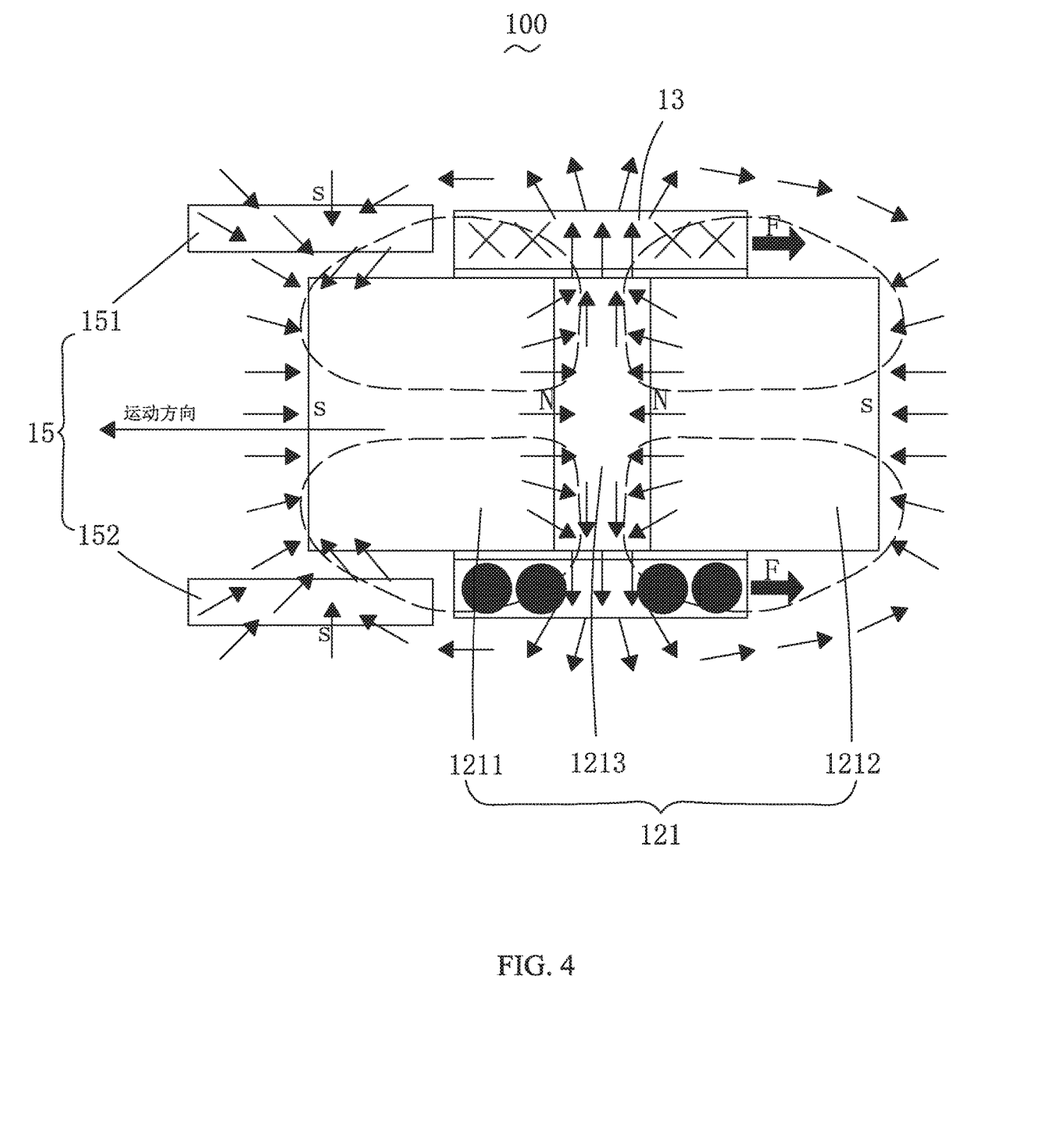
FIG. 4 is a driving principle diagram of the linear vibration motor shown in the present disclosure.

FIG. 4 is a driving principle diagram of the linear vibration motor 100 according to the first embodiment of the present disclosure. Referring to FIG. 4 which shows a magnetic field of the magnets, magnetic polarities of two adjacent opposing faces of the first magnet 1211 and the second magnet 1212 are the same as each other, and the magnetization direction of the magnetic recovery assembly 15 is perpendicular to that of the first magnet 1211. When the vibrator 12 is in the equilibrium position, the orthographic projections of the first magnet 1211 and the magnetic recovery assembly 15 on the plane containing the guide shaft 141 in the direction perpendicular to the sliding direction of the weight 122 at least partially overlap with each other. When the coil 13 is charged with a current with a direction as shown in FIG. 4, the energized coil 13 interacts with the magnetic field generated by the first and second magnets 1211, 1212. A force F toward the right is thus exerted on the coil 13. Since the coil 13 is fixed with respect to the housing 11, a counterforce of the force F is exerted to the vibrator 12 and thus the vibrator 12 moves toward the left. Similarly, when the coil 13 is fed with a current with a reverse direction, the vibrator 12 moves to the right. When the coil 13 is de-energized, the first magnet 1211 is attracted by the magnetic recovery assembly 15, so that the vibrator 12 can be maintained at a balance position where the end surface of the first magnet 1211 away from the second magnet 1212 is aligned with the middle position of the magnetic recovery assembly 15. An attraction force is generated between the magnetic recovery assembly 15 and the vibrator 12 during the vibrator 12 moving to the left or the right away from the balanced position, and the attraction force functions as the recovery force of the spring.

Figure 5:
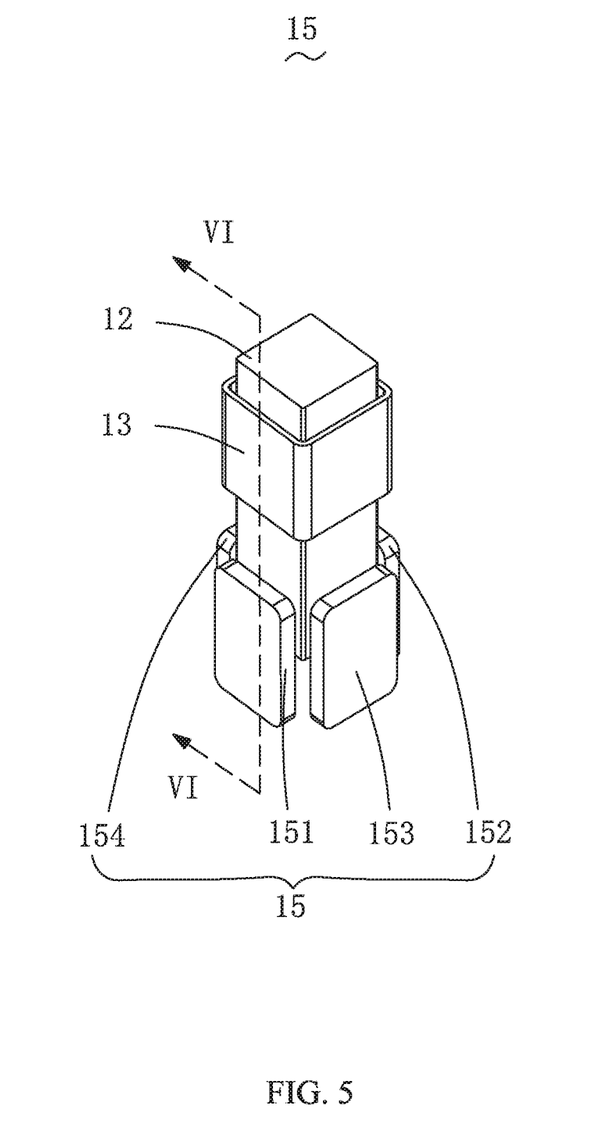
FIG. 5 is a schematic perspective view of a second embodiment of a magnetic recovery assembly according to the present disclosure.
Figure 6:
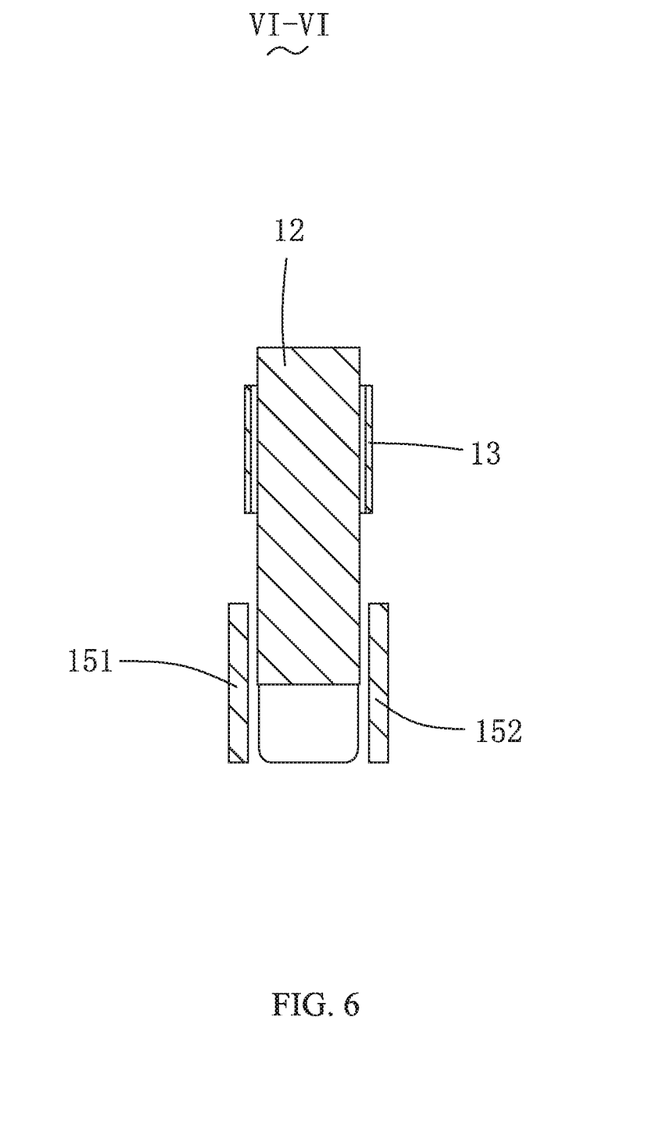
FIG. 6 is a cross-sectional view taken along line VI-VI of the magnetic recovery assembly shown in FIG. 5.

FIG. 5 is a schematic perspective view of a second embodiment of the magnetic recovery assembly according to the present disclosure. FIG. 6 is a cross-sectional view taken along line VI-VI of the magnetic recovery assembly shown in FIG. 5. Referring to FIG. 5 and FIG. 6, in this embodiment, the magnetic recovery assembly 15 further includes a third recovery member 153 and a fourth recovery member 154 located on opposite sides of the magnetic circuit system 121 in another direction perpendicular to the vibration direction of the vibrator 12. The magnetic polarities of opposing faces of the third recovery member 153 and the fourth recovery member 154 are the same. The first recovery member 151, the second recovery member 152, the third recovery member 153 and the fourth recovery member 154 cooperatively form a substantially rectangular ring surrounding the vibrator 12.

Figure 7:
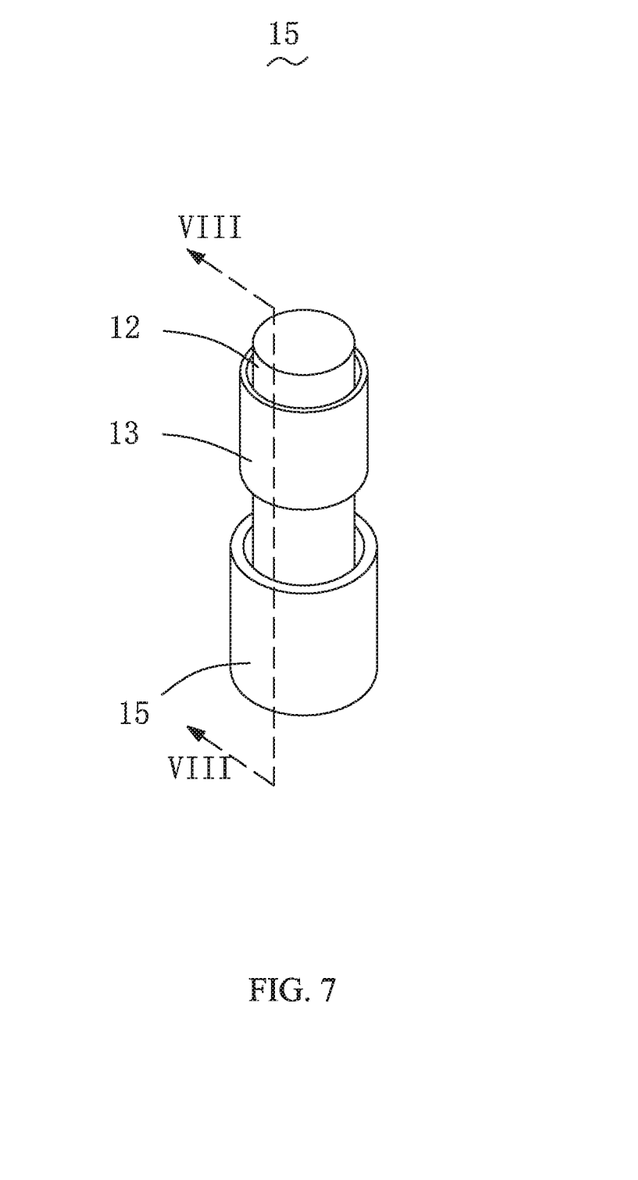
FIG. 7 is a schematic perspective view of a third embodiment of the magnetic recovery assembly according to the present disclosure.
Figure 8:
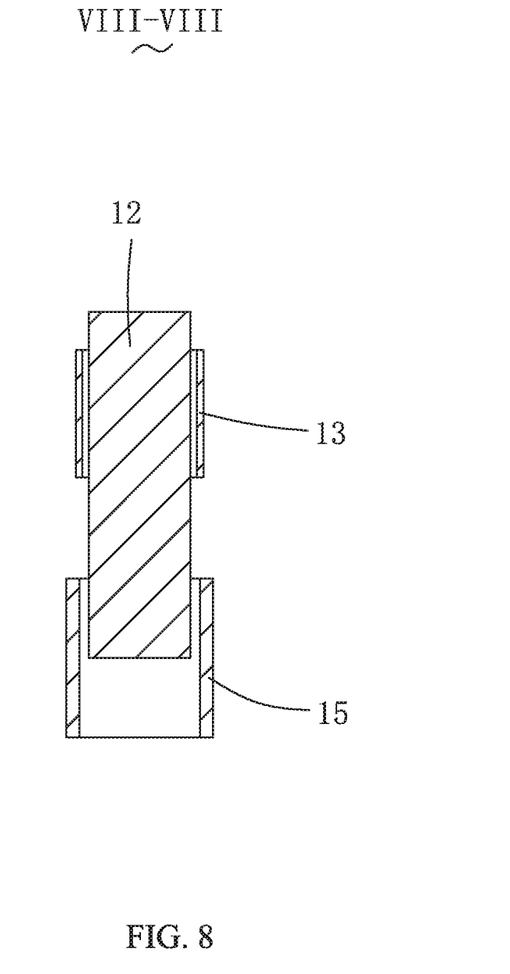
FIG. 8 is a cross-sectional view taken along line VIII-VIII of the magnetic recovery assembly shown in FIG. 7.

FIG. 7 is a schematic perspective view of a third embodiment of the magnetic recovery assembly according to the present disclosure. FIG. 8 is a cross-sectional view taken along the line VIII-VIII of the magnetic recovery assembly shown in FIG. 7. Referring to FIG. 7 and FIG. 8, in this embodiment, the magnetic recovery assembly 15 has an integral structure with an annular ring shape which is sleeved on the vibrator 12. The magnetic recovery assembly 15 is magnetized in a radial direction thereof. The inner surface of the magnetic recovery assembly 15 faces the vibrator 12 and the magnetic polarity of the inner surface of the magnetic recovery assembly 15 is the same as that of the end of the first magnet 1211 away from the second magnet 1212.

Embodiment II

Figure 9:
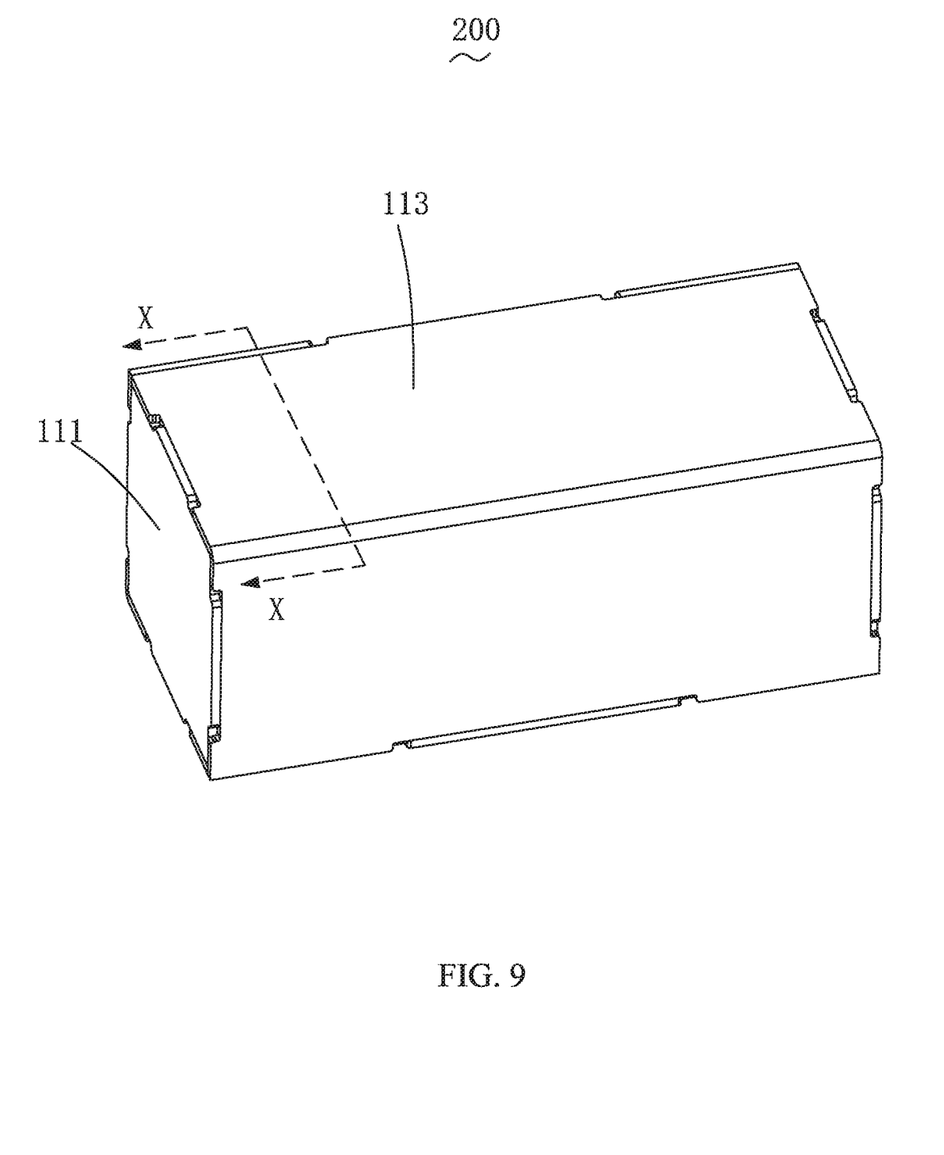
FIG. 9 is a schematic exploded view of a second embodiment of the linear vibration motor according to the present disclosure.
Figure 10:
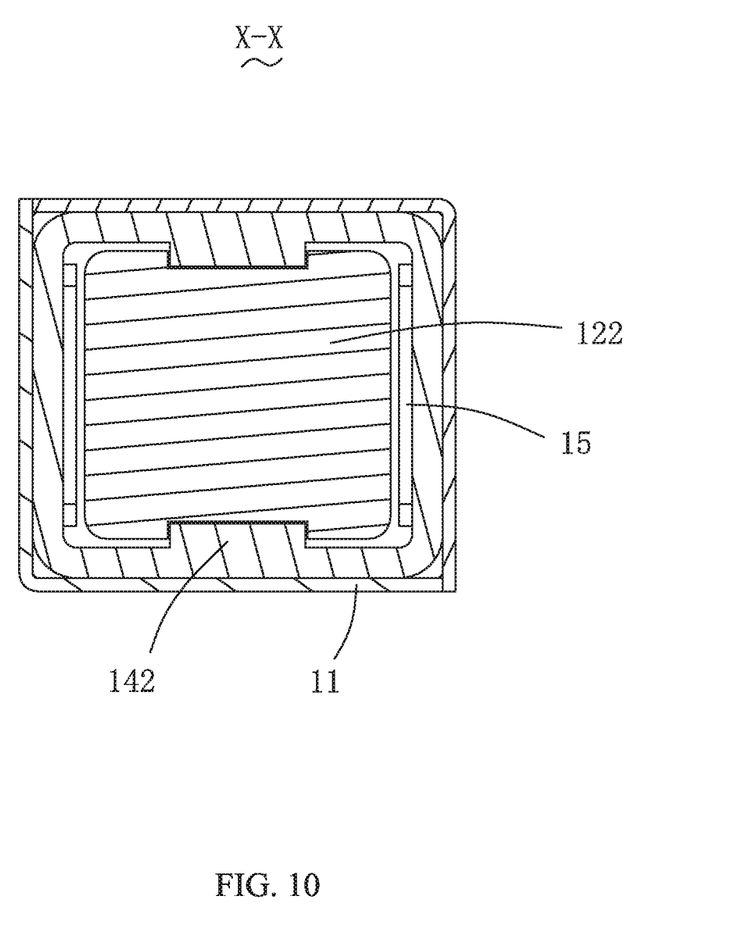
FIG. 10 is a cross-sectional view taken along line X-X of the second embodiment of the linear vibration motor shown in FIG. 9.
Figure 11:
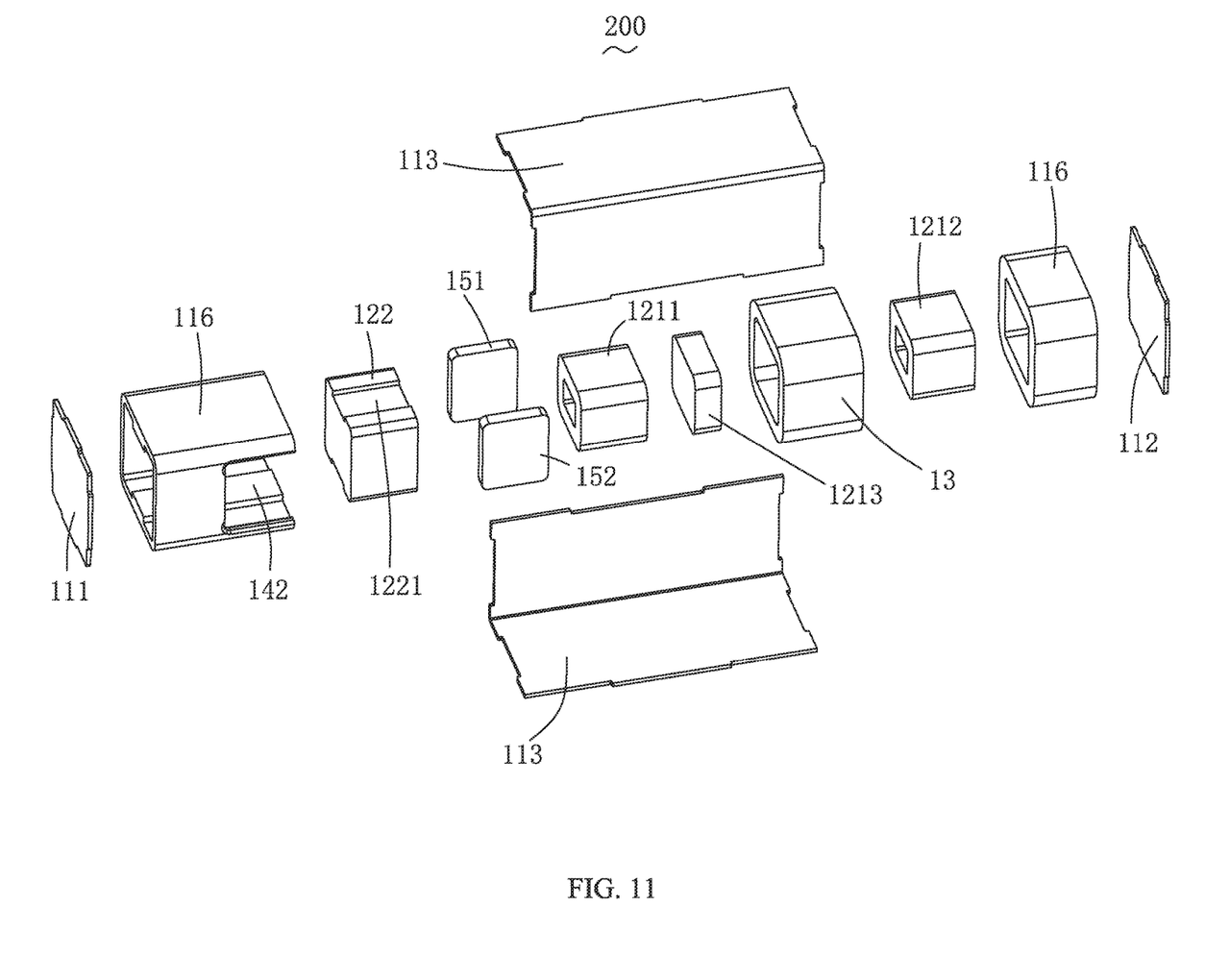
FIG. 11 is a partial schematic perspective view of the second embodiment of the linear vibration motor shown in FIG. 10 with its details.

FIG. 9 is a schematic exploded view of a second embodiment of the linear vibration motor according to the present disclosure, FIG. 10 is a cross-sectional view taken along a line X-X of a second embodiment of the linear vibration motor shown in FIG. 9, and FIG. 11 is a partial schematic perspective view showing the second embodiment of the linear vibration motor of FIG. 10 with its details. Referring to FIGS. 9-11, the linear vibration motor of the second embodiment is basically the same as the linear vibration motor of the first embodiment. The same reference numbers are used to label the same elements. Descriptions for the same elements are omitted. Only the differences are described below. In the linear vibration motor 200 of this embodiment, the housing 11 includes a first end cover 111 and a second end cover 112 located opposite to each other in the vibration direction of the vibrator 12, and an enclosure wall 116 enclosing the vibrator along the vibration direction of the vibrator 12. The enclosure wall 116, the first end cover 111 and the second end cover 112 cooperatively form the receiving space. The guide member includes a guide rail 142 protruding from an inner face of the enclosure wall 116, and a guide slot 1221 formed on an outer surface of the weight 122 facing the guide rail 142. The guide rail 142 is slidably received in the guide slot 1221 for guiding movement of the vibrator 12 in the vibration direction. Lubricant may be added to the guide rail 142 and the guide slot 1221 to reduce the frictional force between the guide rail 142 and the weight 122 during the movement of the vibrator 12. Alternatively, the positions of the guide rail 142 and guide slot 1221 are exchangeable. That is, the guide rail 142 is formed on the weight 122 while the guide slot 1221 is formed in the enclosure wall 116.

In particular, the guide rails 142 and guide slots 1221 are formed on opposite sides of the vibrator 12 and each guide rail 142 corresponds to a guide slot 1221.

Compared with the related art, the linear vibration motor according to the present disclosure is provided with the guide member 14 and the magnetic recovery assembly 15. During operation, the linear vibration motor 100/200 at one end provides the recovery force to the vibrator 12 by use of the magnetic field force, and at the other end the energized coil 13 interacts with the magnetic field generated by the first and second magnets to generate Lorentz force, so that the vibrator 12 can realize large-stroke vibration.

The above-described are only embodiments of the present disclosure. It shall be noted that those skilled in the art may make improvements without departing from the spirit or scope of the present disclosure. All these improvements fall into the protection scope of the present disclosure.

What is claimed is:

1. A linear vibration motor comprising
a housing with a receiving space;
a vibrator received in the receiving space, the vibrator comprising a magnetic circuit system which comprises a first magnet and a second magnet both being magnetized in a vibration direction of the vibrator, magnetic polarities of opposing surfaces of the first magnet and the second magnet being the same;
a coil fixed to the housing for driving the vibrator to vibrate, the coil surrounding the magnetic circuit system and spaced apart from the magnetic circuit system;
a guide member fixed to the housing, the guide member being slidably connected with the vibrator and supporting the vibrator in a direction perpendicular to the vibration direction of the vibrator; and
a magnetic recovery assembly fixed to the housing and located at a side of the vibrator close to the first magnet, a magnetic polarity of a side of the magnetic recovery assembly facing the vibrator being the same as that of an end of the first magnet close to the second magnet, magnetic force between the magnetic recovery assembly and the magnetic circuit system providing a recovery force for the vibrator, and when the vibrator is in an equilibrium position, a centroid of the vibrator being located between the magnetic recovery assembly and the coil.

2. The linear vibration motor according to claim 1, wherein the magnetic recovery assembly includes a first magnetic recovery member and a second magnetic recovery member located on opposite sides of the magnetic circuit system in a direction perpendicular to the vibration direction of the vibrator, and magnetic polarities of opposing faces of the first magnetic recovery member and the second magnetic recovery member are the same as each other.

3. The linear vibration motor according to claim 2, wherein the magnetic recovery assembly further includes a third recovery member and a fourth recover member located on opposites sides of the magnetic circuit system in another direction perpendicular to the vibration direction of the vibrator, magnetic polarities of opposing faces of the third recovery member and the fourth recovery member are the same as each other, and the first recovery member, the second recovery member, the third recovery member and the fourth recovery member cooperatively form a ring surrounding the vibrator.

4. The linear vibration motor according to claim 1, wherein the magnetic recovery member is in a ring shape and sleeved over the vibrator.

5. The linear vibration motor according to claim 1, wherein the magnetic circuit system further comprises a pole plate fixed between the first magnet and the second magnet.

6. The linear vibration motor according to claim 5, wherein the housing includes a first end cover and a second end cover arranged oppositely in the vibration direction of the vibrator, the guide member includes a guide shaft provided between the first end cover and the second end cover and extending along the vibration direction of the vibrator, and the vibrator is slidably sleeved on the guide shaft.

7. The linear vibration motor according to claim 6, wherein the vibrator further comprises a weight fixed to an end of the magnetic circuit system close to the magnetic recovery assembly, a first bearing is embedded in the weight, and the weight is in sliding fit with the guide shaft via the first bearing which is slidably sleeved on the guide shaft.

8. The linear vibration motor according to claim 7, wherein a second bearing is embedded in the second magnet and the second magnet is in sliding fit with the guide shaft via the second bearing which is slidably sleeved on the guide shaft.

9. The linear vibration motor according to claim 5, wherein the housing comprises a first end cover and a second end cover arranged oppositely in the vibration direction of the vibrator, and an enclosure wall enclosing the vibrator in the vibration direction of the vibrator, and the enclosure wall, the first end cover and the second end cover cooperatively form the receiving space; and wherein the vibrator further comprises a weight fixed to an end of the first magnet away from the coil, the guide member comprises at least one guide rail formed on a face of one of the enclosure wall and the weight, and at least one guide slot formed in a face of the other of the enclosure wall and the weight, the at least one guide rail being slidably received in the at least one guide slot to thereby guide movement of the vibrator.

10. The linear vibration motor according to claim 9, wherein the at least one guide rail comprises multiple guide rails, the at least one guide slot comprises multiple guide slots, the multiple guide rails and guide slots are respectively formed on opposite sides of the vibrator, and each guide rail corresponds to one guide slot.

11. The linear vibration motor according to claim 1, wherein a magnetization direction of the magnetic recovery assembly is perpendicular to a magnetization direction of the first magnet.

12. The linear vibration motor according to claim 11, wherein when the vibrator is in the equilibrium position, orthographic projections of the first magnet and magnetic recovery assembly on a plane containing the guide shaft in a direction perpendicular to the vibration direction of the vibrator at least partially overlap with each other.

13. The linear vibration motor according to claim 11, wherein when the coil is de-energized, the vibrator is located at a balance position where an end surface of the first magnet away from the second magnet is aligned with a middle position of the magnetic recovery assembly.

* * * * *